US012581014B2

(12) United States Patent
Bunnell et al.

(10) Patent No.: US 12,581,014 B2
(45) Date of Patent: Mar. 17, 2026

(54) DISASTER PLAN IMPLEMENTATION FOR A UNIFIED COMMUNICATIONS NETWORK

(71) Applicant: Nuwave Communications, Inc., Las Vegas, NV (US)

(72) Inventors: Mark Bunnell, Henderson, NV (US); Dorn Bhechsonggram, Claremont, CA (US); Shing Wo Chan, Rosemead, CA (US); Kyle Thomas, Three Bridges, NJ (US)

(73) Assignee: Nuwave Communications, Inc., Las Vegas, NV (US)

( * ) Notice: Subject to any disclaimer, the term of this patent is extended or adjusted under 35 U.S.C. 154(b) by 54 days.

(21) Appl. No.: 18/687,779

(22) PCT Filed: Dec. 22, 2022

(86) PCT No.: PCT/US2022/053866
§ 371 (c)(1),
(2) Date: Feb. 28, 2024

(87) PCT Pub. No.: WO2023/122301
PCT Pub. Date: Jun. 29, 2023

(65) Prior Publication Data
US 2025/0112991 A1 Apr. 3, 2025

Related U.S. Application Data

(60) Provisional application No. 63/293,523, filed on Dec. 23, 2021.

(51) Int. Cl.
*H04M 7/00* (2006.01)
*H04L 65/1096* (2022.01)
(Continued)

(52) U.S. Cl.
CPC .... *H04M 3/42102* (2013.01); *H04L 65/1096* (2013.01); *H04M 3/42348* (2013.01); *H04M 3/5116* (2013.01); *H04M 3/54* (2013.01)

(58) Field of Classification Search
CPC ............... H04L 51/56; H04L 65/1096; H04M 3/42102; H04M 3/5116; H04M 3/42348;
(Continued)

(56) References Cited

U.S. PATENT DOCUMENTS

| | | |
|---|---|---|
| 5,222,128 A | 6/1993 | Daly et al. |
| 10,749,824 B1 | 8/2020 | Robles et al. |

(Continued)

FOREIGN PATENT DOCUMENTS

| | | |
|---|---|---|
| CN | 107070684 A | 8/2017 |

OTHER PUBLICATIONS

PCT International Search Report and Written Opinion dated Apr. 24, 2023, PCT International Application No. PCT/US22/53866, pp. 1-17.

(Continued)

*Primary Examiner* — Md S Elahee
(74) *Attorney, Agent, or Firm* — Resolute Legal PLLC

(57) ABSTRACT

A method for rerouting communication in a unified communications network. The method comprises: receiving, at a disaster plan server, a mapping of an original telephony number to a substitute telephony number; storing, at the disaster plan server, the mapping between the original telephony number and the substitute telephone number as part of a disaster plan; receiving, at a disaster plan server, a request to activate the disaster plan; transmitting, from the disaster plan server to a routing server, a message to activate the disaster plan based on receiving the request to activate the disaster plan; revising, at the routing server, routing details to the original telephony number based on the (Continued)

disaster plan; and routing, at a session border controller, a call to the original telephony number to a new destination based on the revised routing details associated with the disaster plan.

20 Claims, 5 Drawing Sheets

(51) Int. Cl.
    *H04M 3/42*         (2006.01)
    *H04M 3/51*         (2006.01)
    *H04M 3/54*         (2006.01)

(58) Field of Classification Search
    CPC ... H04M 3/54; H04M 2242/30; H04W 76/00;
               H04W 76/50; H04W 4/02; G06Q 10/06
    USPC ........................................................ 379/219
    See application file for complete search history.

(56)              References Cited

U.S. PATENT DOCUMENTS

| | | |
|---|---|---|
| 2004/0064436 A1* | 4/2004 | Breslin ................. G06Q 10/06 |
| 2005/0195802 A1 | 9/2005 | Klein et al. |
| 2010/0220585 A1 | 9/2010 | Poulson et al. |
| 2013/0331075 A1 | 12/2013 | Hole |
| 2016/0127540 A1 | 5/2016 | Sharma et al. |
| 2016/0142894 A1 | 5/2016 | Papakonstantinou et al. |

OTHER PUBLICATIONS

Extended European Search Report dated Oct. 27, 2025, EP Application No. 22912505.9, pp. 1-8.
Canadian Office Action and Examination Search Report dated Jan. 6, 2026, CA Application No. 3,244,149, pp. 1-7.

* cited by examiner

DISASTER PLAN IMPLEMENTATION FOR A UNIFIED COMMUNICATIONS NETWORK

CROSS-REFERENCE TO RELATED APPLICATIONS

This application is a U.S. National Stage Application of International Application No. PCT/US22/53866, filed Dec. 22, 2022, which claims the benefit of U.S. Provisional Patent Application Ser. No. 63/293,523, filed Dec. 23, 2021, entitled "Disaster Plan Implementation for a Unified Communications Network", the entire disclosure of which is hereby incorporated by reference herein.

FIELD OF THE DISCLOSURE

The present disclosure relates to the technical field of unified communications (UC) networks which involve an integration of enterprise communication services such as instant messaging (chat), voice services (including IP telephony), audio and video conferencing and desktop sharing. More specifically, the present disclosure relates to the implementation of a communications disaster plan system and method for dealing with an unexpected outage of the enterprise communications services, such as in a UC network environment.

BACKGROUND

In a UC network environment one of the services that is provided to users is the ability to make and receive voice calls over the same unified virtual network that is used to share chat services and audio/video conferencing and desktop sharing between users. These voice calls can be made between two users who are each using the UC environment. The calls can also involve one user who is using the UC environment and another user who is not using the UC environment and is instead using an ordinary telephone network, known as the PSTN or public switched telephone network. In the latter case, for example, a user (a calling party) using a standard telephone device initiates a call over a standard PSTN network to another user (a called party) who is using a device (such as a laptop computer) connected to a UC network. Examples of UC networks, include Microsoft Teams™, Zoom™, Cisco WebEx™, Vonage™ and Avaya™ (these are trademarks of the respective companies mentioned).

A UC network can be employed at an enterprise, such as a corporation, a hospital or other organization for use by employees of such an enterprise. For example, a software development company, a law firm, a hospital, or a police station may set up a UC network so that employees of the law firm, hospital or police station can make and receive voice calls both to internal parties within the enterprise and to parties outside of the enterprise. The employees may have their own phone numbers and users wishing to call a particular employee (whether the user wishing to make the call is inside or outside of the enterprise), would dial the number of the employee that they wish to speak to.

The use of a UC network can result in big cost savings for an enterprise, as opposed to the enterprise using standard PSTN for all its employees. However, one of the downsides to using a UC network for all telephony calls within an enterprise is that there is sometimes a disaster event that occurs where the UC network experiences an outage, such that none of the unified communications services (chat, desktop sharing and voice calls) are available at a particular time. This could be, for example, due to a natural disaster (e.g., an earthquake, a flood, a hurricane, or the like) at the data center location where the UC network is hosted. This could also be due to a LAN (local area network) or WAN (wide area network) failure at the data center where the UC network is hosted. Other possible causes of such UC network outages could be an active directory being down, a required certificate being expired, or some other failure or problem.

When one of these events occurs, there can be an unexpected outage of the UC network. Called parties using the UC network can be unreachable by any calling parties, until the outage has been remedied. This is highly disadvantageous for the enterprise, as many calls will go unanswered. Where an enterprise is a medical facility, missed called could be life threatening. For a business enterprise (e.g., a corporation) important sales calls could be lost, deals cannot be fulfilled, etc., which can seriously affect the financial health of the company.

BRIEF SUMMARY

In some aspects, the techniques described herein relate to a method for rerouting communication in a unified communications network, the method including: receiving, at a disaster plan server, a mapping of an original telephony number to a substitute telephony number; storing, at the disaster plan server, the mapping between the original telephony number and the substitute telephony number as part of a disaster plan; receiving, at a disaster plan server, a request to activate the disaster plan; transmitting, from the disaster plan server to a routing server, a message to activate the disaster plan based on receiving the request to activate the disaster plan; revising, at the routing server, routing details to the original telephony number based on the disaster plan; and routing, at a session border controller, a call to the original telephony number to a new destination based on the revised routing details associated with the disaster plan.

In some aspects, the techniques described herein relate to a method, wherein the message to activate the disaster plan includes the mapping between the original telephony number and the substitute telephony number.

In some aspects, the techniques described herein relate to a method, wherein the routing server revises its call routing for the original telephony number and causes inbound calls to the original telephony number to be routed to a device associated with the substitute telephony number.

In some aspects, the techniques described herein relate to a method, wherein the request to activate the disaster plan is received from a user device.

In some aspects, the techniques described herein relate to a method, wherein the request to activate the disaster plan is based on automatically detecting an interruption to a device associated with the original telephony number.

In some aspects, the techniques described herein relate to a method, wherein the request to activate the disaster plan is based on an interruption, wherein the interruption is an outage to a device associated with the original telephony number.

In some aspects, the techniques described herein relate to a method, wherein the disaster plan stores a plurality of mappings between a plurality of original telephony numbers and a plurality of substitute telephony numbers.

In some aspects, the techniques described herein relate to a method, wherein the plurality of original telephony numbers is a batch of original telephony numbers and wherein the routing of the call to the original telephony number to the new destination includes routing calls for the batch of original telephony numbers.

In some aspects, the techniques described herein relate to a method, wherein the batch of original telephony numbers includes a predetermined quantity of original telephony numbers.

In some aspects, the techniques described herein relate to a method, wherein the predetermined quantity of original telephony numbers in the batch of original telephony numbers is determined based on a transaction per second load capacity of the routing server.

In some aspects, the techniques described herein relate to a method, further including revising, at the routing server, routing details to the plurality of original telephony numbers based on the disaster plan.

In some aspects, the techniques described herein relate to a method, further including storing a plurality of different disaster plans.

In some aspects, the techniques described herein relate to a method, wherein the plurality of different disaster plans enables revising call routing for different groupings of original telephony numbers.

In some aspects, the techniques described herein relate to a method, wherein the disaster plan stores details for rerouting the original telephony number to the substitute telephony number for a first subset of enterprise users while routing to the original telephony number for a second subset of enterprise users.

In some aspects, the techniques described herein relate to a method, wherein the first subset of enterprise users has similar job function.

In some aspects, the techniques described herein relate to a method, wherein the first subset of enterprise users is located in a same office.

In some aspects, the techniques described herein relate to a method for rerouting communication in a unified communications network, the method including: receiving, at a first disaster plan server, a mapping of an original telephony number to a substitute telephony number; storing, at the first disaster plan server, the mapping between the original telephony number and the substitute telephony number as part of a first disaster plan; receiving, at a second disaster plan server, a mapping of an original telephony number to a substitute telephony number; storing, at the second disaster plan server, the mapping between the original telephony number and the substitute telephony number as part of a second disaster plan; receiving, at one of said first disaster plan server and said second disaster plan, a request to activate one of said first disaster plan and said second disaster plan; transmitting, from one of said first disaster plan server to a first routing server and said second disaster plan server to a second routing server, a message to activate one of said first disaster plan and said second disaster plan based on receiving the request to activate one of said first disaster plan and the second disaster plan; revising, at one of said first routing server and said second routing server, routing details to the original telephony number based on one of said first disaster plan and said second disaster plan; and routing, at a first session border controller or a second session border controller, a call to the original telephony number to a new destination based on the revised routing details associated with one of said first disaster plan and said second disaster plan.

In some aspects, the techniques described herein relate to a method, wherein data for the second disaster plan is same as data for the first disaster plan.

In some aspects, the techniques described herein relate to a method, wherein the first disaster plan server and the second disaster plan server are at different locations.

In some aspects, the techniques described herein relate to a method for rerouting communication in a unified communications network, the method including: receiving, at a disaster plan server, a mapping of an original telephony number to a substitute telephony number; storing, at the disaster plan server, the mapping between the original telephony number and the substitute telephony number as part of a disaster plan; receiving, at the disaster plan server, a request to activate the disaster plan; transmitting, from the disaster plan server to a first routing server or a second routing server, a message to activate the disaster plan based on receiving the request to activate the disaster plan; revising, at one of said first routing server and said second routing server, routing details to the original telephony number based on the disaster plan; and routing, at a first session border controller or a second session controller, a call to the original telephony number to a new destination based on the revised routing details associated with the disaster plan.

BRIEF SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

According to some implementations of the present disclosure, predetermined disaster plan mapping information can be stored in a disaster plan server for use in conjunction with a communications network such as a UC network. The predetermined disaster plan mapping information can be used to update routing details for communication traffic (e.g., voice calls, video calls, SIP traffic, etc.) used to reach user endpoints (e.g., desk phone, computer, mobile phone, etc.) over a communications network. For example, the predetermined disaster plan mapping information can be used in when a disaster event occurs to update call routing details (e.g., remap telephony number details) used to reach users of voice services over a communications network, with substitute call routing details for such users. One or more of such plans can be predetermined in advance to meet various requirements of an enterprise depending, for example, on the nature of the event or the needs of the enterprise.

DETAILED DESCRIPTION

Figure 1A:
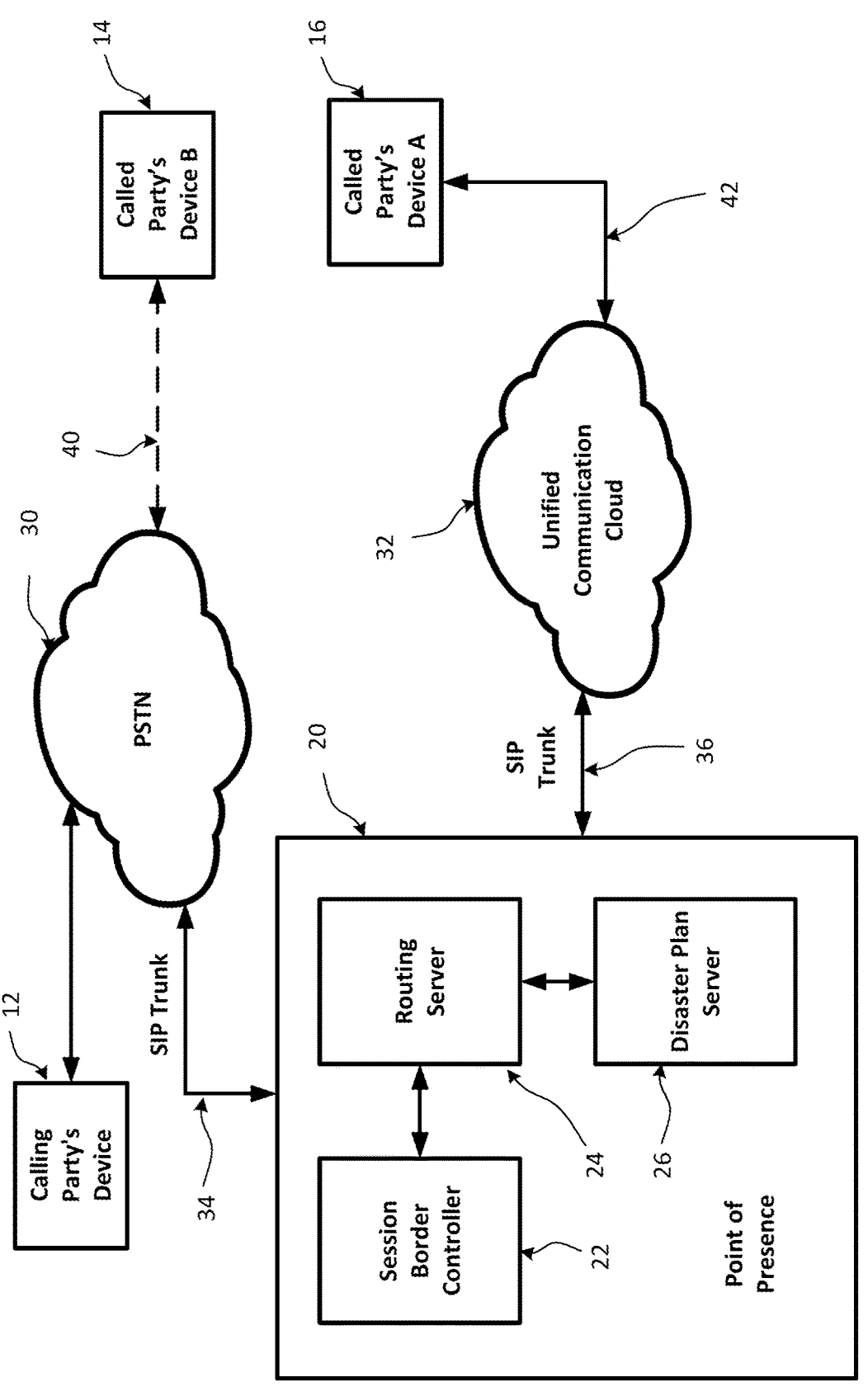
FIG. 1A is a diagram showing a system according to some implementations of the disclosure.

It is to be understood that the disclosure is not limited in its application to the details of construction and the arrangement of components set forth in the following description or illustrated in the following drawings. The features described in the disclosure are capable of other implementations and of being practiced or of being carried out in various ways. Also, it is to be understood that the phraseology and terminology used herein is for the purpose of description and should not be regarded as limiting.

As used throughout, the singular forms "a," "an" and "the" include plural referents unless the context clearly dictates otherwise. Thus, for example, reference to "a server" can include two or more such servers unless the context indicates otherwise.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The following discussion is presented to enable a person skilled in the art to make and use implementations of the disclosure. Various modifications to the illustrated implementations will be readily apparent to those skilled in the art, and the generic principles herein can be applied to other implementations and applications without departing from implementations of the disclosure. Thus, implementations of the disclosure are not intended to be limited to implementations shown but are to be accorded the widest scope consistent with the principles and features disclosed herein. The following detailed description is to be read with reference to the figures, in which like elements in different figures have like reference numerals. The figures, which are not necessarily to scale, depict selected implementations and are not intended to limit the scope of implementations of the disclosure. Skilled artisans will recognize the examples provided herein have many useful alternatives and fall within the scope of implementations of the disclosure.

This disclosure is directed to a system and method which implements a disaster plan mapping process for storing and enabling at least one predetermined set of substitute routing communication information for one or more users of a communications network. It is to be understood that the terms "disaster plan mapping" and "disaster plan" may be used interchangeable in this disclosure, unless the context indicates otherwise (e.g., in some context "disaster plan mapping" is used to describe the mapping process and "disaster plan" is used to describe the resulting mapped plan while in some context "disaster plan mapping" is used to describe both the mapping process and the resulting mapped plan). In some implementations, upon the occurrence of a disaster or some other event, the predetermined set of substitute routing communication information can be quickly and easily deployed to reconfigure communication routing equipment to reroute communications to users of the communications network. Any particular enterprise could create several such predetermined sets of substitute routing communication information, to be used in different scenarios, as will be described below. In some implementations, the substitute routing communication information may include telephony numbers, session initiation protocol (SIP) addresses, and/or other suitable information used to route communication traffic.

Figure 1B:
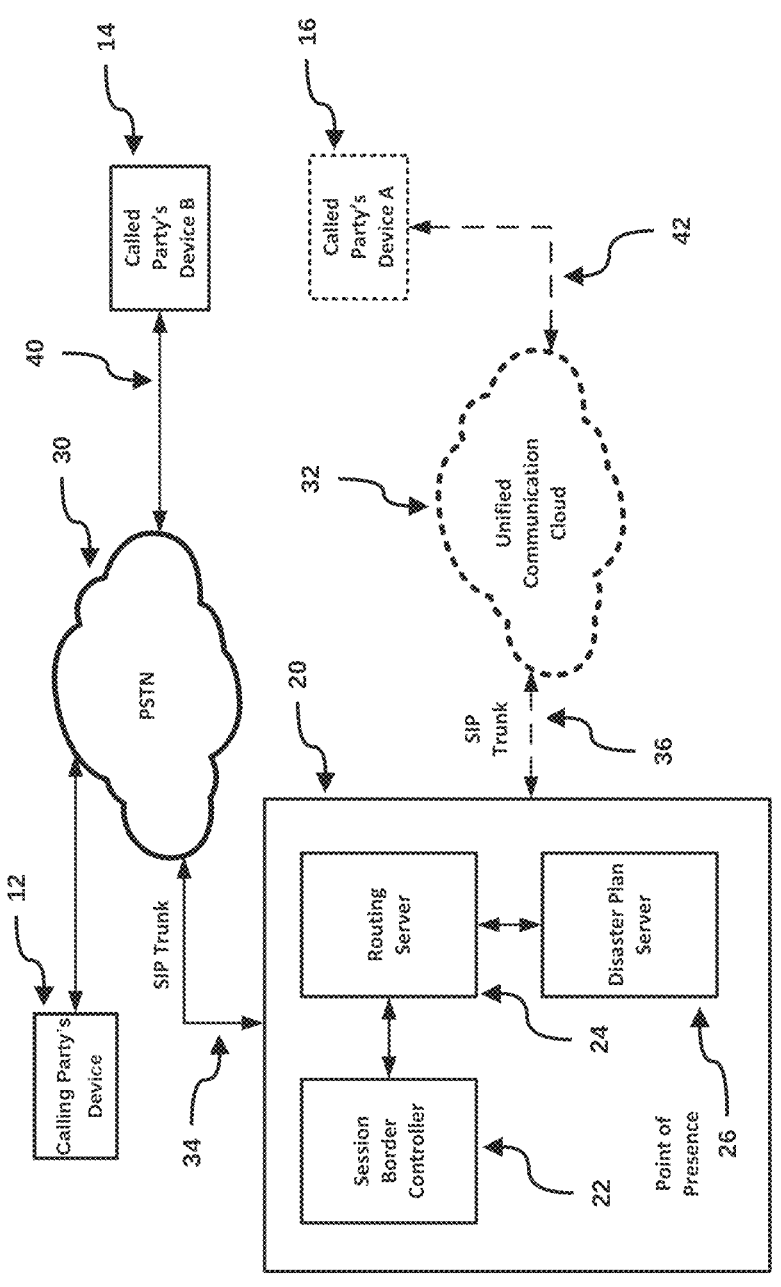
FIG. 1B is a diagram showing a system according to some implementations of the disclosure.

FIGS. 1A and 1B show an example configuration of a system in accordance with some implementations of this disclosure. In particular, FIG. 1A illustrates one scenario where a Calling Party contacts a Called Party, wherein the system operates without relying on alternative communication routing due to the execution of a disaster plan. FIG. 1B illustrates one scenario where a Calling Party contacts a Called Party, wherein the system operates using alternative communication routing due to the execution of a disaster plan.

FIGS. 1A and 1B illustrates a Point of Presence ("PoP") 20 that may include, but are not limited to, one or more Session Border Controllers 22, one or more Routing Servers 24, and one or more Disaster Plan Servers 26. For ease of explanation, FIGS. 1A and 1B illustrate a limited number of communication end points (e.g., the Calling Party's Device 12, Called Party's Device A 16, and the Called Party's Device B 14). It should be appreciated that in a real-world environment, the system and method may facilitate communications between numerous communication end points (e.g., from as few as two communication endpoints to millions of endpoints). FIGS. 1A and 1B also illustrate two communication networks. a Public Switched Telephone Network ("PSTN") 30 and a Unified Communication Cloud 32, supported by the system. It should be appreciated that the system and method may support more than two communication networks. In some implementations, these communication networks can be any suitable type of communication network (e.g., not limited to a PSTN or a Unified Communications Cloud). FIGS. 1A and 1B also illustrate a plurality of communication links 34 and 36 between the different devices and systems. In some implementations, as shown as an example, the communication link 34 between the PSTN 30 and the PoP 20 can be a Session Initiation Protocol ("SIP") trunk. In some implementations, as shown as an example, the communication link between the PoP 20 and the Unified Communication Cloud 32 can also be a SIP trunk 36. It should be appreciated that the communication links in FIGS. 1A and 1B can be any suitable communication links (e.g., not limited to SIP trunks). It should also be appreciated that the communication links between any two devices or systems shown in FIGS. 1A and 1B may include one or more physical and/or logical communication links.

In FIG. 1A, a Calling Party using a communication endpoint 12 (e.g., a telephone device) makes a telephone call over the PSTN 30, attempting to reach a Called Party (e.g., who is using Called Party's Device A 16). In some implementations, the Calling Party's communication device 12 can be any suitable communication endpoint (e.g., a mobile phone, a desktop telephone, a VoIP telephone, etc.).

In some implementations, Called Party's Device A 16 can be any suitable communication endpoint (e.g., a mobile phone, a desktop telephone, an VoIP telephone, etc.). Called Party's Device A 16 is illustrated as connected to a Unified Communication Cloud 32. The Unified Communication Cloud 32 can be used to implement UC services, including voice telephony services, for an enterprise of which the Called Party is associated with (e.g., the Called Party can be an employee of the enterprise). In this example, the Called Party also has another device (Called Party's Device B 14), but the Calling Party is attempting to establish a voice call with Called Party's Device A 16, not Called Party's Device B 14. Called Party's Device B 14, in this example, could be a standard telephone device connected to the PSTN 30, or the Called Party's Device B 14 could be a mobile or cellular telephone device or some other suitable communication endpoint device (e.g., a computer, etc.). In some implementations, the Called Party may have one or more alternative communication end points that could be used to communicate with the Called Party.

In some implementations, the Unified Communications Cloud (e.g., a UC network) 32 can be hosted on a subscription-based and cloud-based data processing network and offered as a service. The Unified Communication Cloud service can be a UCCaaS platform (Unified Communications and Collaboration as a Service). The Unified Communication Cloud 32 can be a hosted unified communication service like Microsoft Teams™, Cisco Webex™, Zoom™, etc. In some implementations, the Unified Communication Cloud service can be an on-premise solution. In some implementations, the Unified Communication Cloud can be a PBX system. It should be appreciated that the Unified Communication Cloud can be any suitable communications system.

In FIG. 1A, the PSTN 30 determines that the Calling Party is trying to reach Called Party's Device A 16 by using the telephone number that the Calling Party has dialed. In some implementations, upon determining that the dialed telephone number belongs to a group of telephone numbers that are to be handled by a particular Session Border Controller ("SBC") 22 in the illustrated PoP system 20, the PSTN 30 routes the call to the particular SBC 22 that was so recognized. Once the SBC 22 receives the call, the SBC 22 may communicate with a routing server (e.g., the Routing Server 24) to determine how to route the incoming call to the Called Party's Device A 16. The Routing Server 24 may include a database that stores call or communication routing information for one or more customers (including for the Called Party). For example, the Routing Server 24 may store in its routing database that voice traffic for the Called Party's phone number should be routed to the Unified Communication Cloud through the SIP trunk 36 illustrated between the PoP 20 and the Unified Communication Cloud 32. The Routing Server 24 may pass the call routing information of the Called Party's phone number (e.g., how to communicate with the Called Party's Device A 16) back to the SBC 22. In some implementations, using the information received from the Routing Server 24, the SBC 22 can forward the call for the Called Party's Device A 16 to the Unified Communication Cloud 32. Once the call is with the Unified Communication Cloud 32, the Unified Communication Cloud 32 may pass the call data traffic to the Called Party's Device A 16 for call termination (e.g., connecting and completing the call between the endpoint 12 of the Calling Party and the Called Party's Device A 16).

The Routing Server described above and as illustrated in the drawings, in some implementations, is a PSX (policy and routing solution), which is a highly reliable yet extremely flexible centralized routing engine for an enterprise, providing intelligent session control and optimizes both management and execution of routing and policy decisions.

The Session Border Controller (SBC) 22 described above and as illustrated in the drawings, in some implementations, is a device deployed at the border between different networks. The SBC 22 can enable SIP communication session data flows in the form of packets to the correct endpoint.

It should be appreciated that other suitable equipment can be used to communicate communication traffic between the Calling Party and the Called Party.

As shown in FIG. 1A, the PoP may also include a Disaster Plan Server 26. This is, for example, a web server accessed via a web portal that an enterprise user can log into, to create and enable a disaster plan, as will be described below. In some implementations, the Disaster Plan Server 26 is a stand-alone server. In some implementations, the features and functions of the Disaster Plan Server 26 can be integrated into servers that perform additional features and functions besides the features and functions of the Disaster Plan Server. For example the features and functions of the Disaster Plan Server can be integrated into servers that perform network communication administration tasks, such as moves, adds, changes, and deletes ("MACD") functions.

In FIG. 1A, Called Party's Device B 14 is shown with a dotted line 40 connected to the PSTN 30, meaning that this is not the connection that is taking place in the example above, because the Calling Party's Device A 16 is being used, as was described above.

FIG. 1B is a continuation of the scenario that was discussed above in FIG. 1A. In FIG. 1B, an event has occurred, where a disaster plan can be executed. It should be appreciated that the disaster plan can be executed without a disaster occurring (e.g., a "disaster plan" can be a plan that can be executed in the event that it would be desirable to reroute calls, data, or text messages intended for one end point to an alternative or substitute end point, without a disaster event occurring). The disaster plan can be used to enable calls intended for Called Party's Device A 16 to be rerouted to the Called Party's Device B 14. In some implementations, Called Party's Device A 16 may be unreachable due to some event or circumstance. In some implementations, the event can be a disaster event, such as a network outage or a system outage (planned or unplanned). For example, the resulting outage may include an impact to the UC network (e.g., the Unified Communication Cloud 32) that is being used by the enterprise of which that the Called Party is associated with. For example, the outage could result in an interruption between the communication over the SIP trunk 36 connecting the PoP 20 with the Unified Communication Cloud 32. In some implementations, the connection 42 between the Unified Communication Cloud 32 and the Called Party's Device A 16 could be interrupted. In FIG. 1B, "X's" are used to show that the elements and connections are down or otherwise communication between one or more of the links are interrupted to the Called Party's Device A 16. In some implementations, it should be appreciated that any one or more of the network elements with the "X" can be down or interrupted. Also, dotted lines are shown for the SIP trunk 36 and for the connection 42 between the Unified Communication Cloud 32 and the Called Party's Device A 16 to illustrate that these connections are interrupted (e.g., an interruption in connection due to an outage).

In FIG. 1B, the connection 40 between the PSTN 30 and Called Party's Device B 14 is now shown as a solid line 40 to illustrate that the Called Party's Device B 14 will receive rerouted calls originally destined for Called Party's Device A 16 due to call routing changes the Disaster Plan Server 26 made to the Routing Server 24. This means that the Called Party will receive the call (from the Calling Party) over the PSTN 30, via the Called Party's Device B 14 (rather than via the Called Party's Device A 16). This has happened because, upon the occurrence of an event (e.g., an outage along the communication path to Called Party's Device A 16), the system of FIG. 1B has replaced the relevant call route mapping information in the PoP's Routing Server 24 with alternative communication routing information as specified in a disaster plan which is managed by the Disaster Plan Server 26.

Figure 2:
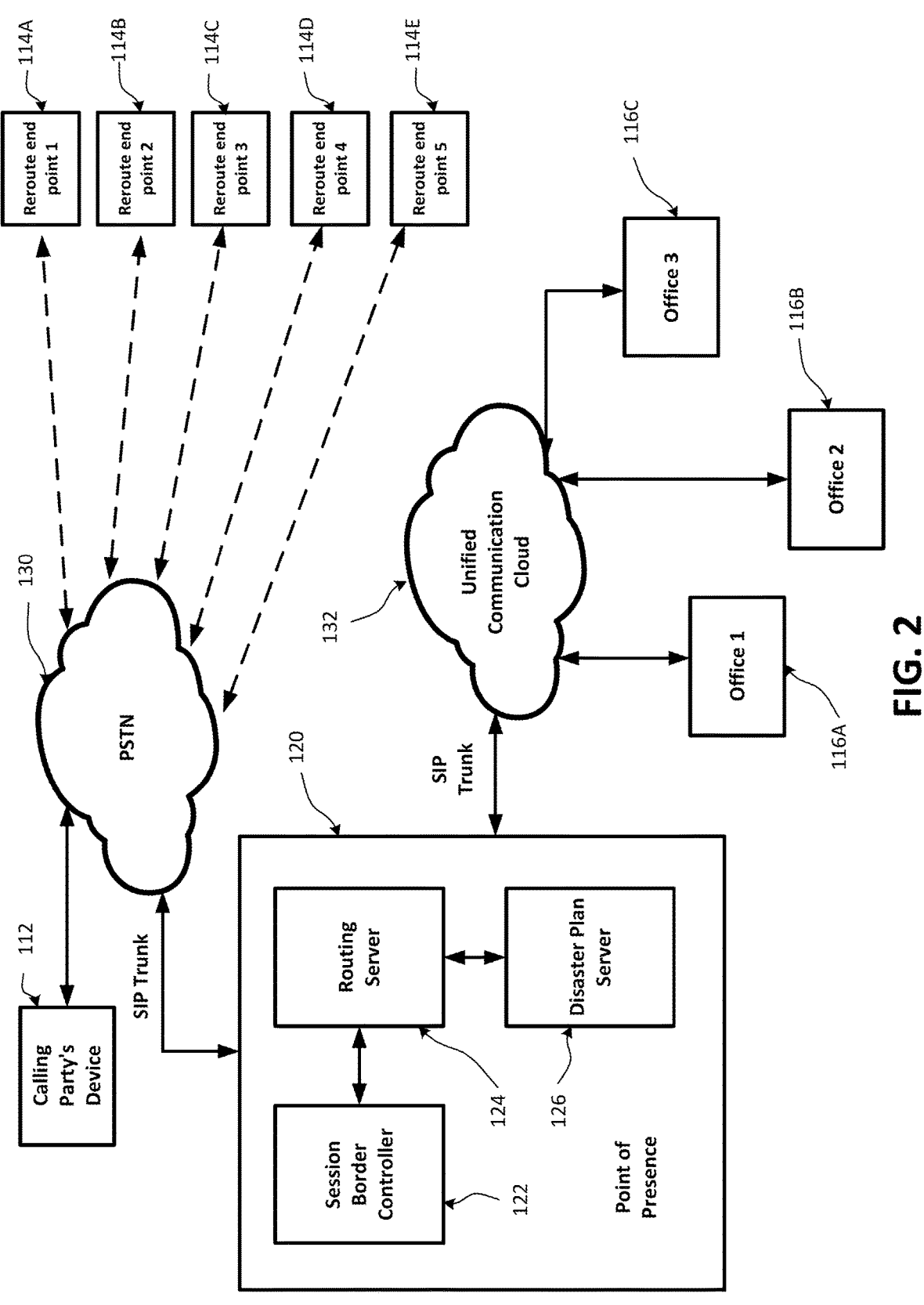
FIG. 2 is a diagram showing a system according to some implementations of the disclosure.

Disaster Plan Server 26 is, for example, a web server, accessed via a web portal. In advance of an event occurring requiring communication rerouting, an enterprise user (such as a systems administrator for the enterprise) can log into the web portal, create and store mapping information of substitute communication traffic routing details for the users associated with the enterprise. For example, the mapping may include details such as communication traffic destined to Called Party's Device A 16 is mapped to be rerouted to Called Party's Device B 14. In some implementations, the substitute communication traffic routing details may include substitute telephone numbers for one or more users of the enterprise (e.g., mapping the telephone number of the Called Party's Device A 16 to the telephone number of the Called Party's Device B 14). In some implementations, the substitute communication traffic routing details may include SIP endpoint address details (e.g., mapping SIP endpoint addresses). It should be appreciated that the substitute communication traffic routing details may include any suitable communication traffic routing details. In some implementations, the mapping information can be for one or more communication endpoints, as shown in FIG. 2. In some implementations, the mapping information could be for a large set of communication endpoints. For example, the mapping information can include substitute details for each and every user (e.g., their communication endpoints) within the enterprise. These substitute communication traffic routing details could be, for example, home telephone numbers for the respective users, mobile (cellular) telephone numbers for the users, or telephone numbers for alternative offices for each such user. In some implementations, the mapping information can include substitute details for a subset/ grouping of enterprise users. For example, the mapping information can include communication traffic routing details for a group or subset of enterprise users: on the same network, in the same office, having similar job functions (or other similarities) to these users' substitute telephone numbers while the Routing Server continues to use the original routing data for other enterprise users.

In the event of a disaster actually occurring (or some suitable event), the enterprise can simply access the web portal of the disaster plan server (for example, by logging into the web portal via a web browser) and select a particular predetermined disaster plan that is stored in the Disaster Plan Server 26 to be enabled or activated. Based the activation of a disaster plan, the Disaster Plan Server 26 can communicate with the Routing Server 24 or otherwise access the Routing Server 26 to alter the communication routing information for Called Party's Device A 16. For example, the Disaster Plan Server 26 can cause the Routing Server 24 to map substitute (or alternative) telephone number details contained in the selected disaster plan between Called Party's Device 16 A and Called Party's Device B 14. The mapping information can cause incoming calls directed to the Called Party's Device A 16 through the Unified Communication Cloud 32 to be routed through the PSTN 30 to the Called Party's Device B 14. Accordingly, call termination between the Calling Party and the Called Party can still occur despite an event that may have caused the Called Party's Device A to be unavailable.

A user (e.g., systems administrator or other suitable person) can select a particular disaster plan in the Disaster Plan Server 26, as was described above at any suitable time, regardless of an event or a disaster. An alternative to this, is that a particular disaster plan can be set as a default and applied automatically once a disaster has occurred and the UC network elements described above have gone down (e.g., the Disaster Plan Server 26 may detect an outage in the Unified Communication Cloud 32 and cause a particular disaster plan to be executed to update the Routing Server 24).

In some implementations, the disaster plan mapping system and method is very flexible in that a particular enterprise can have a plurality of disaster plans, predetermined in advance, for use in different types of scenarios. For example, as shown in FIG. 2, in a disaster scenario where there is a complete outage with respect to the Unified Communication Cloud 132 used to connect all users of a particular enterprise (e.g., all the users in Office 1 116A, Office 2 116B, Office 3 116C), one disaster plan could be predetermined where all telephone number details for all users at all locations 116A, 116B, 116C of the enterprise are mapped to the users' corresponding substitute end points 114A, 114B, 114C, 114D, 114E or numbers (e.g., home phone numbers or cellular phone numbers for each user). It should be appreciated that the SBC 122, the Routing Server 124 and the Disaster Plan Server 126 of PoP 120, as shown in FIG. 2, each functions and interacts with the other servers and the communication networks (e.g., PSTN 130 and Unified Communications Cloud 132) in the same manner as the SBC 22, the Routing Server 24 and the Disaster Plan Server 26 of PoP 20, as shown in FIGS. 1A and 1B, unless the context indicates otherwise.

In some implementations, for which there is instead a local failure, such as a WAN or LAN outage at one location or site of an enterprise, a different predetermined disaster plan could be selected where the telephone number details for all users associated with the location or site which has experienced the WAN or LAN outage, are mapped to substitute telephone number details, and the Routing Server continues to use the original routing data for other enterprise users at other sites. For example, FIG. 2 shows three different offices, Office 1 116A, Office 2 116B and Office 3 116C, for an enterprise and a rerouting of calls to a plurality of substitute end points: Reroute end point 1 114A, Reroute end point 2 114B, Reroute end point 3 114C, Reroute end point 4 114D, Reroute end point 5 114E. In an example for which enterprise users in Office 1 116A have devices at substitute end point 1 114A and substitute end point 2 14B, enterprise users in Office 2 116B have devices at substitute end point 3 14C and substitute end point 4 14D, and enterprise user in Office 3 has device at substitute end point 5 14E; a disaster plan could be predetermined for which the telephone number details are mapped to the devices at substitute end point 1 114A and substitute end point 2 14B upon an outage only at Office 1 116A and the Routing Server 124 of PoP 120 continues to use the original routing data for other enterprise users at Office 2 116B and Office 3 116C (e.g., does not reroute to substitute points 3 14C, 4 14D and 5 14E).

In some implementations, there could be a disaster plan predetermined where the telephone number details are for only a subset of employees of the enterprise who have similar job functions, such as executives (e.g., Vice Presidents or the like) of the enterprise or call center workers who take important sales calls from potential customers, are replaced with the substitute details, and the Routing Server continues to use the original routing data for other enterprise users with other job functions. For such implementations, the disaster plan is mapped such that only calls to a subset of employees of the enterprise, who receives important calls, requires to promptly respond, requires immediate direct interactions, etc., are rerouted to their corresponding substitute end points in the event of a disaster while the Routing Server continues to use the original routing data for other enterprise users.

As previously discussed, in some implementations, the UC network can be hosted on a subscription-based and cloud-based data processing network and offered as a service. For example, the Called Party can have a Device A 16, that is a computer having a unified communication service (e.g., Microsoft Teams™ or Zoom™) installed on the computer. The Called Party can also have a Device B 14, that is a mobile or cellular phone having a Short Message Service (SMS) texting program on the mobile phone. In this example, the Calling Party attempts to send a text message to Called Party's Device A 16, not the Called Party's Device B 14. However, Called Party's Device A 16 is unreachable due to a disaster event, such as a network outage or a system outage that includes an impact to the UC network that is being used by the enterprise of which that the Called Party is associated with. For example, as shown in FIG. 1B, the outage could result in an interruption between the communication over the SIP trunk 36 connecting the PoP 20 with the Unified Communication Cloud 32. The system of FIG. 1B then replaces the text message route mapping information in the PoP's Routing Server 24 with alternative communication routing information as specified in the disaster plan, managed by the Disaster Plan Server 26. For this example, the disaster plan, managed by the Disaster Plan Server 26, specified to the Routing Server 24 with the alternative or substitute routing information for the Called Party Device B 14, the mobile phone having a SMS texting program, to receive the text message originally destined for the Called Party's Device A 16, the computer having Microsoft Teams™ or Zoom™ installed.

Figure 3:
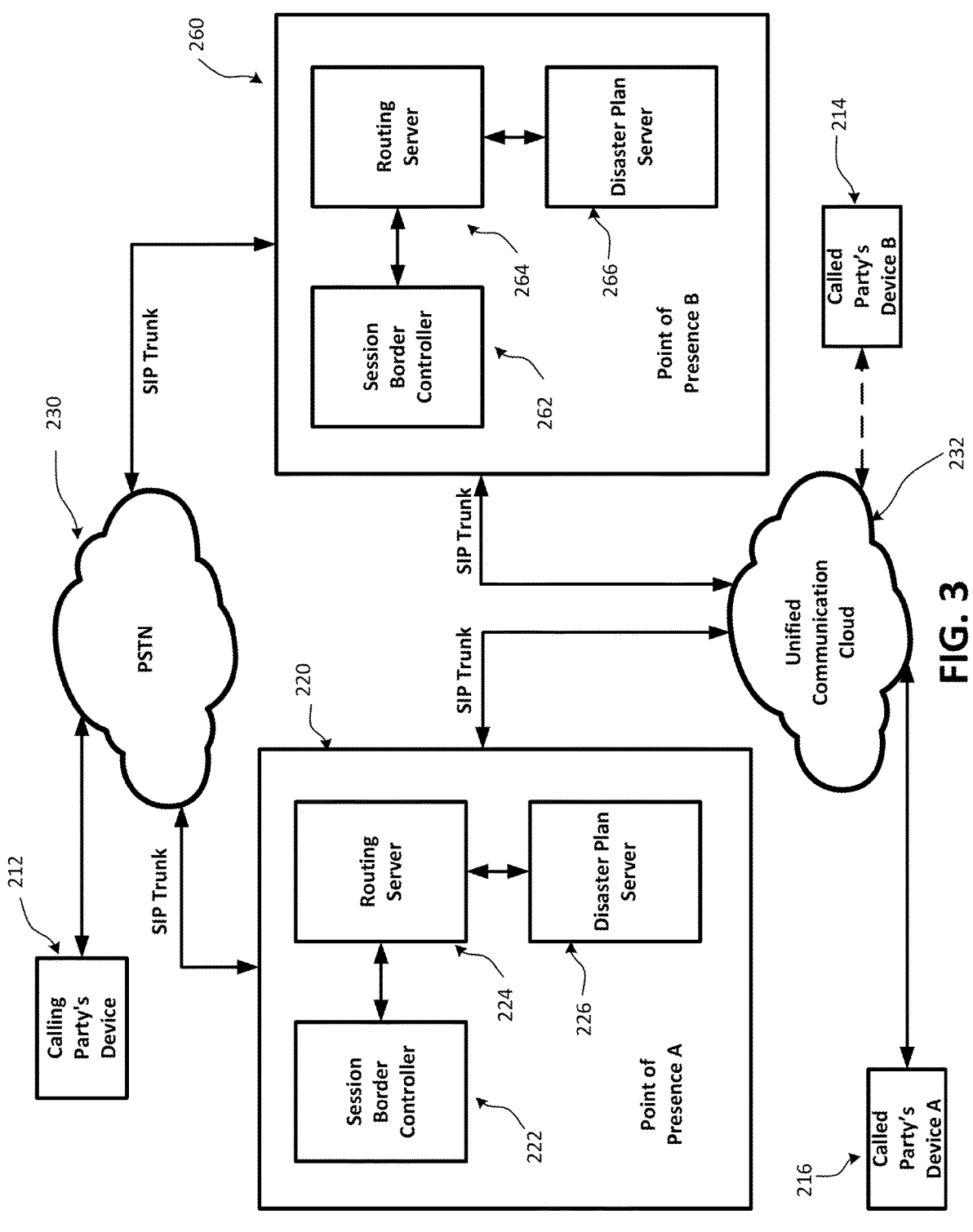
FIG. 3 is a diagram showing a system according to some implementations of the disclosure.

FIG. 3 shows a scenario, according to some implementations of the disclosure, where two PoPs 220, 260 are included as mirror sites. In some implementations, the PoPs 220, 226 can be substantially identical to each other. In some implementations, the PoPs 220, 260 can be configured with different equipment than each other. These mirror site PoPs 220, 260 are, for example, can be located in different geographic regions (e.g., different continents or different countries), so that network traffic can be dealt with by the mirror site PoP 220, 260 located nearest to where the calls are either originating from or terminating. In some implementations, each mirror site PoP 220, 260 has its own Disaster Plan Server 226, 266 and Routing Server 224, 264, and the same disaster plan mapping data (e.g. rerouting communication intended for Called Party's Device A 216 to Called Party's Device B 214 in the event of a disaster) would be applied to the respective Routing Server 224, 264 at each PoP 220, 260, in the event of a disaster, to help ensure that the disaster plan mapping works in a consistent manner. It should be appreciated that the SBC 222, the Routing Server 224 and the Disaster Plan Server 226 of PoP 220, as shown in FIG. 3, each functions and interacts with the other servers of PoP 220 and the communication networks (e.g., PSTN 230 and Unified Communications Cloud 232) in the same manner as the SBC 22, the Routing Server 24 and the Disaster Plan Server 26 of PoP 20, as shown in FIGS. 1A and 1B, unless the context indicates otherwise. Likewise, the SBC 262, the Routing Server 264 and the Disaster Plan Server 266 of PoP 260, as shown in FIG. 3, each functions and interacts with the other servers of PoP 260 and the communication networks (e.g., PSTN 230 and Unified Communications Cloud 232) in the same manner as the SBC 22, the Routing Server 24 and the Disaster Plan Server 26 of PoP 20, as shown in FIGS. 1A and 1B, unless the context indicates otherwise.

Alternatively, a single Disaster Plan Server could be used and the disaster plan sent to each Routing Server from the single Disaster Plan Server (alternative implementations not illustrated). In such alternative implementations, the system includes a single Disaster Plan Server and two or more Routing Servers in which the single Disaster Plan Server could send the disaster plan or multiple disaster plans to the two or more Router Servers. Implementations having two or more Routing Servers allow the system to continue to operate should one of the Routing Servers crashes, or otherwise becomes inoperable. Implementations having two or more Routing Servers also allow the system to split the volume of communication routing changes among multiple Routing Servers, thus, allowing each Routing Server to better handle the data volumes allocated to it.

Alternatively, in some implementations, Disaster Plan Servers are not located within PoPs and can be in communication with one or more Routing Servers (alternative implementations not illustrated). For example, for a scenario where two PoPs are included in the system as mirror sites, each of the Disaster Plan Servers may be a web server accessed via a web portal that an enterprise user can log into to create and enable a disaster plan. Likewise, for a scenario where a single Disaster Plan Server could be used to send the disaster plan or plans to two or more Router Servers, the Disaster Plan Server may be a web server accessed via a web portal that an enterprise user can log into to create and enable a disaster plan.

In some implementations, the Routing Server may have certain technical restrictions in terms of how much data can be supplied to it at any one time or how many configuration changes can be made to it to avoid the Routing Server being flooded with data such that it cannot handle the data flow rate (e.g., causing the Routing Server to crash or otherwise become less responsive or unresponsive). In some implementations, these technical restrictions (such as a transaction per second threshold for the Routing Server) are taken into account to deal with the situation where a large number of changes to the Routing Server's data are being made at the same time (e.g., in the event of a disaster or other event causing the Disaster Plan Server to make more than a threshold quantity of changes at the Routing Server). In some implementations, the communication routing changes can be sent to the Routing Server, from the Disaster Plan Server, in batches, to better handle the data volumes. This results in a throttling of the data flow of the communication routing changes. For example, the number of data elements to include in a batch can be set at an appropriate amount, determined based on the transaction per second threshold, determined such that the threshold is not exceeded. The data can then be queued and gathered into a batch of the determined size. Once a batch has been communicated to the Routing Server from the Disaster Plan Server, then the Disaster Plan Server can send the next batch to the Routing Server. The specifics of the batching can be implemented within the software of the Disaster Plan Server using appropriate Application Programming Interfaces (APIs) to the Routing Server.

Batching the communication routing changes could be implemented in a system with a single PoP, as illustrated in FIGS. 1A, 1B and 2, or a system with multiple PoPs, as illustrated in FIG. 3. For example, in a system with a single PoP 20 (see FIGS. 1A and 1B), to avoid the Routing Server 24 being flooded with data, such that the Router Server 24 cannot handle the data flow rate or in order to mitigate the chance of the Routing Server 24 crashing or become less responsive or unresponsible; the Disaster Plan Server 26 could sent to the Routing Server 24, the communication routing changes in batches that would allow the Routing Server 24 to better handle the data volumes. In some implementations, only after the Router Server 24 has handled, or substantially handled, the communication routing changes in a batch sent by the Disaster Plan Server 26, could the Disaster Plan Server 26 send another batch of communication routing changes to the Router Server 24. In a system with multiple PoPs (see FIG. 3) the system can be set up such that the Disaster Plan Server 226 of the first PoP 220 could send a first batch of communication routing changes to the Routing Server 224. The Disaster Plan Server 266 of the second PoP 260 could then send a second batch of communication routing changes to the Routing Server 264 that are different than the communication routing changes in the first batch. In some implementations, only after the Router Server 224 of the first PoP 220 has handled, or substantially handled, the communication routing changes in the first batch, could the Disaster Plan Server 226 send another batch of communication routing changes to the Router Server 224. Likewise, in some implementations, after the Router Server 264 of the second PoP 260 has handled, or substantially handled, the communication routing changes in the second batch, could the Disaster Plan Server 266 send another batch of communication routing changes to the Router Server 264.

In the implementations previously discussed as alternative to the scenario in FIG. 3, for which the system has a single Disaster Plan Server and two or more Routing Servers and the disaster plan is sent to each Routing Server from the single Disaster Plan Server (implementations not illustrated); the system could be set up such that the Disaster Plan Server could send a first batch of communication routing changes to the first Routing Server and then the Disaster Plan Server could send a second batch of communication routing changes, that are different than the communication routing changes in the first batch, to the second Routing Server. In some implementations, only after the First Router Server has handled, or substantially handled, the communication routing changes in the first batch, could the single Disaster Plan Server send another batch of communication routing changes to the first Router Server. Likewise, in some implementations, only after the second Router Server has handled, or substantially handled, the communication routing changes in the second batch, could the single Disaster Plan Server send another batch of communication routing changes to the second Router Server.

In some implementations, the disaster plan mapping data could be sent to both the Routing Server, and in these cases, the technical specifications of both devices could be taken into account in determining the batch sizes.

In some implementations, a batch communication routing details can be reserved for a single customer (enterprise) of the PoP. The batch size for that customer can be determined, as above, based on the technical specifications of the equipment, and set so as to maximize the communication routing details being transferred. For example, if one customer has 10,000 users, all of which are to have substitute telephony details transferred according to a selected disaster plan, and the batch size limit is 10,000 telephony details, then all of the data can be queued and gathered into one batch and transferred together. Alternatively, a batch can be shared between customers where the batch size is large and the number of users involved in the particular disaster plans being actioned at any one time, is small. Various other configurations between customers, batches and disaster plans can be implemented, according to the specific requirements, and can be programmed into the Disaster Plan Server.

Figure 4:
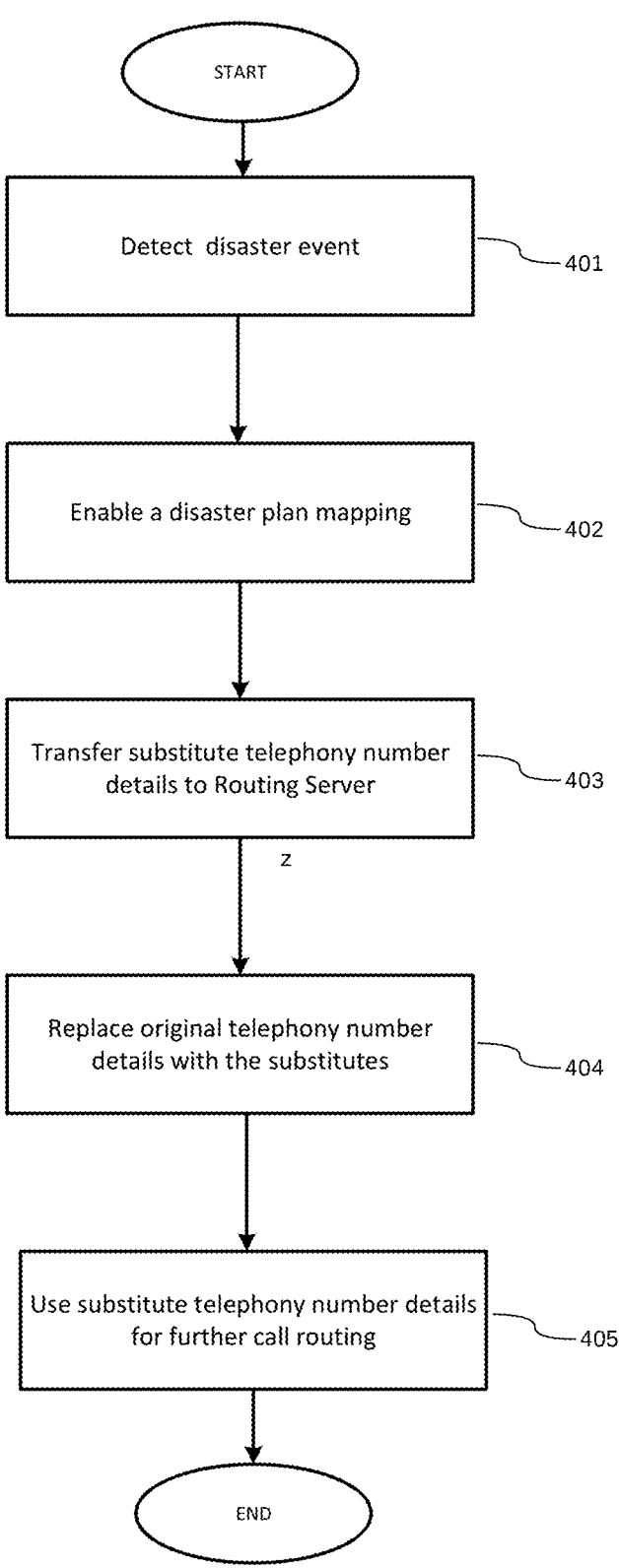
FIG. 4 is a flow chart showing a method according to some implementations of the disclosure.

FIG. 4 is a flowchart showing the functional blocks involved, according to some implementations of the present disclosure and incorporates the applicable previously discussed descriptions for the implementations shown in FIGS. 1A, 1B, 2 and 3. At first functional block 401, in some implementations, a disaster event is detected as having occurred. As mentioned above, the disaster event could be detected by a user at the enterprise alerting the PoP that a disaster event has occurred by logging into the Disaster Plan Server web portal and enabling one of the disaster plans. Alternatively, the disaster event could be detected automatically, for example, by detecting an outage in communications over the UC network.

At the next functional block 402, in some implementations, the Disaster Plan Server enables a disaster plan mapping upon detection that a disaster event has occurred. The disaster plan mapping that is enabled could be the disaster plan mapping that is selected by the user representing the enterprise, when this user logs into the Disaster Plan Server web portal. The disaster plan mapping that is enabled could also be a default plan that is automatically selected and enabled upon an automatic detection of a disaster event (e.g., where the Disaster Plan Server automatically detects an outage in communications over the UC network). For example, as described previously in association with the implementations shown in FIGS. 1A, 1B, 2 and 3; the disaster plan mapping, stored in the Disaster Plan Server 26, 126, 226, 266, includes the predetermined set of substitute routing communication information that can be quickly and easily deployed to reconfigure communication routing equipment to reroute users of the communications network from the original telephony number to the substitute telephony number. Also as described previously, it should be appreciated that the disaster plan mapping can reroute communication other than calls, such as data and text messages and while the example described herein FIG. 4 uses telephony number as an example, mapping to each end point is not limited to telephony numbers. Also as described previously in association with the implementations shown in FIG. 2, the disaster plan mapping can store a plurality of mappings between a plurality of original telephony numbers and substitute telephony numbers.

At the next functional block 403, in some implementations, the Disaster Plan Server transfers the substitute telephony number details that make up the selected disaster plan mapping from the Disaster Plan Server to the Routing Server. For example, as described previously in association with the implementations shown in FIGS. 1A and 1B; the Disaster Plan Server 26 can transfer the substitute telephony number details that make up the selected disaster plan mapping from the Disaster Plan Server 26 to the Routing Server 24. Also as described previously in association with FIG. 3, the Disaster Plan Server 226 of the first PoP 220 can transfer the substitute telephony number that make up the selected disaster plan mapping from the Disaster Plan Server 226 to the Routing Server 224 and/or the Disaster Plan Server 266 of the second PoP 260 can transfer the substitute telephone number that make up the selected disaster plan mapping from the Disaster Plan Server 266 to the Routing Server 264. Also as described previously, a Disaster Plan Server can transfer a batch of original telephony numbers and the corresponding substitute telephony numbers. In some implementations, only after the Routing Server has rerouted, or substantially rerouted the entire batch of original telephony numbers to their corresponding substitute telephony numbers (to be discussed in block 405 below), will the Disaster Plan Server send another batch of original telephone numbers and their corresponding substitute telephony numbers. Also as described previously, a single Disaster Plan Server can transfer a first set of substitute telephony numbers to a first Routing Server and the single Disaster Plan Server can transfer a second set of substitute telephony numbers to a second Routing Server.

At the next functional block 404, in some implementations, the Routing Server maps the original telephony number details with the substitute telephony number details that were just transferred at 403 from the Disaster Plan Server.

At the next functional block 405, in some implementations, the Routing Server uses the substitute telephony details for further call routing to enterprise users who were affected by the selected disaster plan mapping. For example, as described previously in association with the implementations shown in FIGS. 1A and 1B; the Routing Server 24 uses the substitute telephony details for call routing to enterprise users who were affected by the selected disaster plan mapping to reroute calls originally destined for Called Party's Device A 16 to Called Party's Device B 14. Also as described previously, the Routing Server can use the substitute telephone details for further call routing to enterprise use who were affected by the selected disaster plan mapping for further call routing to reroute a batch of original telephony numbers to the corresponding substitute telephony numbers for the entire batch of original telephony numbers.

While it has been described above that the substitute telephony number details are transferred from the Disaster Plan Server to the Routing Server, in some implementations, the substitute telephony number details could also be transferred to the Session Border Controller (or in some cases the substitute telephony number details could be transferred only to the Session Border Controller).

It should be appreciated that the systems and methods described herein provide for new and innovative ways to handle the continued provision of communication services to customers in the event of a disaster event or for other suitable reasons. These systems and methods implementing the functions of the Disaster Plan Server are technological improvements that clearly improves the functioning of the network because of the enormous increase in communications efficiency (e.g., through greater continuity of communications traffic).

The flowchart and block diagram in the Figures show the functionality and operation of possible implementations of systems, methods and computer programs, according to implementations of the present disclosure. Each block in the flow chart or block diagram may represent a module segment or portion of code, which comprises one or more executable instructions for implementing the specified logical function or functions. It should be noted that in alternative implementations, the functions may occur out of the order indicated in the figures. This can include two or more blocks being executed simultaneously as opposed to one after the other, or some can be executed in reverse order. In some implementations, the functionality and operation may include fewer than the blocks illustrated (e.g., some of the features and functionality of a block is not used to implement the system and method described herein).

Each block can be implemented by special purpose hardware-based systems that perform the specified functions or acts, or combinations of specialized hardware and computer instructions (software).

Clause 1. A method for rerouting communication in a unified communications network, the method comprising: receiving, at a disaster plan server, a mapping of an original telephony number to a substitute telephony number; storing, at the disaster plan server, the mapping between the original telephony number and the substitute telephony number as part of a disaster plan; receiving, at a disaster plan server, a request to activate the disaster plan; transmitting, from the disaster plan server to a routing server, a message to activate the disaster plan based on receiving the request to activate the disaster plan; revising, at the routing server, routing details to the original telephony number based on the disaster plan; and routing, at a session border controller, a call to the original telephony number to a new destination based on the revised routing details associated with the disaster plan.

Clause 2. The method of clause 1, wherein the message to activate the disaster plan comprises the mapping between the original telephony number and the substitute telephony number.

Clause 3. The method of clause 2, wherein the routing server revises its call routing for the original telephony number and causes inbound calls to the original telephony number to be routed to a device associated with the substitute telephony number.

Clause 4. The method of clause 1, wherein the request to activate the disaster plan is received from a user device.

Clause 5. The method of clause 1, wherein the request to activate the disaster plan is based on automatically detecting an interruption to a device associated with the original telephony number.

Clause 6. The method according to clause 1, wherein the request to activate the disaster plan is based on an interruption, wherein the interruption is an outage to a device associated with the original telephony number.

Clause 7. The method of clause 1, wherein the disaster plan stores a plurality of mappings between a plurality of original telephony numbers and a plurality of substitute telephony numbers.

Clause 8. The method of clause 7, wherein the plurality of original telephony numbers is a batch of original telephony numbers and wherein the routing of the call to the original telephony number to the new destination includes routing calls for the batch of original telephony numbers.

Clause 9. The method of clause 8, wherein the batch of original telephony numbers comprises a predetermined quantity of original telephony numbers.

Clause 10. The method of clause 9, wherein the predetermined quantity of original telephony numbers in the batch of original telephony numbers is determined based on a transaction per second load capacity of the routing server.

Clause 11. The method of clause 7, further comprising revising, at the routing server, routing details to the plurality of original telephony numbers based on the disaster plan.

Clause 12. The method of clause 1, further comprising storing a plurality of different disaster plans.

Clause 13. The method of clause 12, wherein the plurality of different disaster plans enables revising call routing for different groupings of original telephony numbers.

Clause 14. The method of clause 1, wherein the disaster plan stores details for rerouting the original telephony number to the substitute telephony number for a first subset of enterprise users while routing to the original telephony number for a second subset of enterprise users.

Clause 15. The method of clause 14, wherein the first subset of enterprise users has similar job function.

Clause 16. The method of clause 14, wherein the first subset of enterprise users is located in a same office.

Clause 17. A method for rerouting communication in a unified communications network, the method comprising: receiving, at a first disaster plan server, a mapping of an original telephony number to a substitute telephony number; storing, at the first disaster plan server, the mapping between the original telephony number and the substitute telephony number as part of a first disaster plan; receiving, at a second disaster plan server, a mapping of an original telephony number to a substitute telephony number; storing, at the second disaster plan server, the mapping between the original telephony number and the substitute telephony number as part of a second disaster plan; receiving, at one of said first disaster plan server and said second disaster plan, a request to activate one of said first disaster plan and said second disaster plan; transmitting, from one of said first disaster plan server to a first routing server and said second disaster plan server to a second routing server, a message to activate one of said first disaster plan and said second disaster plan based on receiving the request to activate one of said first disaster plan and the second disaster plan; revising, at one of said first routing server and said second routing server, routing details to the original telephony number based on one of said first disaster plan and said second disaster plan; and routing, at a first session border controller or a second session border controller, a call to the original telephony number to a new destination based on the revised routing details associated with one of said first disaster plan and said second disaster plan.

Clause 18. The method of clause 17, wherein data for the second disaster plan is same as data for the first disaster plan.

Clause 19. The method of clause 17, wherein the first disaster plan server and the second disaster plan server are at different locations.

Clause 20. A method for rerouting communication in a unified communications network, the method comprising: receiving, at a disaster plan server, a mapping of an original telephony number to a substitute telephony number; storing, at the disaster plan server, the mapping between the original telephony number and the substitute telephony number as part of a disaster plan; receiving, at the disaster plan server, a request to activate the disaster plan; transmitting, from the disaster plan server to a first routing server or a second routing server, a message to activate the disaster plan based on receiving the request to activate the disaster plan; revising, at one of said first routing server and said second routing server, routing details to the original telephony number based on the disaster plan; and routing, at a first session border controller or a second session controller, a call to the original telephony number to a new destination based on the revised routing details associated with the disaster plan.

Clause 21. In some aspects, the techniques described herein relate to a system including a processor, and a storage medium storing instructions, which when executed by the processor, causes the system to carry out the method of any one of the prior 20 clauses.

In some aspects, the techniques described herein relate to a machine-readable medium carrying machine readable instructions, which when executed by a processor of a machine, causes the machine to carry out the method of any one of clause 1 through clause 20.

The present disclosure is not to be limited in terms of the particular implementations described in this disclosure, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the disclosure have been described. Various modifications may be made without departing from the spirit and scope of the disclosure. For example, various forms of the method/process flows shown above may be used, with operations or steps re-ordered, added, or removed. Accordingly, other implementations are within the scope of the following claims.

We claim:

1. A method for rerouting communication in a unified communications network, the method comprising:
   receiving, at a disaster plan server, a mapping of an original telephony number to a substitute telephony number;
   storing, at the disaster plan server, the mapping between the original telephony number and the substitute telephony number as part of a disaster plan;

receiving, at a disaster plan server, a request to activate the disaster plan;

transmitting, from the disaster plan server to a routing server, a message to activate the disaster plan based on receiving the request to activate the disaster plan;

revising, at the routing server, routing details to the original telephony number based on the disaster plan; and routing, at a session border controller, a call to the original telephony number to a new destination based on the revised routing details associated with the disaster plan.

2. The method of claim 1, wherein the message to activate the disaster plan comprises the mapping between the original telephony number and the substitute telephony number.

3. The method of claim 2, wherein the routing server revises its call routing for the original telephony number and causes inbound calls to the original telephony number to be routed to a device associated with the substitute telephony number.

4. The method of claim 1, wherein the request to activate the disaster plan is received from a user device.

5. The method of claim 1, wherein the request to activate the disaster plan is based on automatically detecting an interruption to a device associated with the original telephony number.

6. The method according to claim 1, wherein the request to activate the disaster plan is based on an interruption, wherein the interruption is an outage to a device associated with the original telephony number.

7. The method of claim 1, wherein the disaster plan stores a plurality of mappings between a plurality of original telephony numbers and a plurality of substitute telephony numbers.

8. The method of claim 7, wherein the plurality of original telephony numbers is a batch of original telephony numbers and wherein the routing of the call to the original telephony number to the new destination includes routing calls for the batch of original telephony numbers.

9. The method of claim 8, wherein the batch of original telephony numbers comprises a predetermined quantity of original telephony numbers.

10. The method of claim 9, wherein the predetermined quantity of original telephony numbers in the batch of original telephony numbers is determined based on a transaction per second load capacity of the routing server.

11. The method of claim 7, further comprising revising, at the routing server, routing details to the plurality of original telephony numbers based on the disaster plan.

12. The method of claim 1, further comprising storing a plurality of different disaster plans.

13. The method of claim 12, wherein the plurality of different disaster plans enables revising call routing for different groupings of original telephony numbers.

14. The method of claim 1, wherein the disaster plan stores details for rerouting the original telephony number to the substitute telephony number for a first subset of enterprise users while routing to the original telephony number for a second subset of enterprise users.

15. The method of claim 14, wherein the first subset of enterprise users has similar job function.

16. The method of claim 14, wherein the first subset of enterprise users is located in a same office.

17. A method for rerouting communication in a unified communications network, the method comprising:

receiving, at a first disaster plan server, a mapping of an original telephony number to a substitute telephony number;

storing, at the first disaster plan server, the mapping between the original telephony number and the substitute telephony number as part of a first disaster plan;

receiving, at a second disaster plan server, a mapping of an original telephony number to a substitute telephony number;

storing, at the second disaster plan server, the mapping between the original telephony number and the substitute telephony number as part of a second disaster plan;

receiving, at one of said first disaster plan server and said second disaster plan, a request to activate one of said first disaster plan and said second disaster plan;

transmitting, from one of said first disaster plan server to a first routing server and said second disaster plan server to a second routing server, a message to activate one of said first disaster plan and said second disaster plan based on receiving the request to activate one of said first disaster plan and the second disaster plan;

revising, at one of said first routing server and said second routing server, routing details to the original telephony number based on one of said first disaster plan and said second disaster plan; and routing, at a first session border controller or a second session border controller, a call to the original telephony number to a new destination based on the revised routing details associated with one of said first disaster plan and said second disaster plan.

18. The method of claim 17, wherein data for the second disaster plan is same as data for the first disaster plan.

19. The method of claim 17, wherein the first disaster plan server and the second disaster plan server are at different locations.

20. A method for rerouting communication in a unified communications network, the method comprising:

receiving, at a disaster plan server, a mapping of an original telephony number to a substitute telephony number;

storing, at the disaster plan server, the mapping between the original telephony number and the substitute telephony number as part of a disaster plan;

receiving, at the disaster plan server, a request to activate the disaster plan;

transmitting, from the disaster plan server to a first routing server or a second routing server, a message to activate the disaster plan based on receiving the request to activate the disaster plan;

revising, at one of said first routing server and said second routing server, routing details to the original telephony number based on the disaster plan; and routing, at a first session border controller or a second session controller, a call to the original telephony number to a new destination based on the revised routing details associated with the disaster plan.

* * * * *